United States Patent
Johansen (10) Patent No.: US 8,774,468 B2
(45) Date of Patent: Jul. 8, 2014

(54) DYNAMIC SHAPE APPROXIMATION

(75) Inventor: Kjetil Vatland Johansen, Sandnes (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 961 days.

(21) Appl. No.: 12/794,947

(22) Filed: Jun. 7, 2010

(65) Prior Publication Data

US 2011/0058710 A1    Mar. 10, 2011

Related U.S. Application Data

(60) Provisional application No. 61/240,442, filed on Sep. 8, 2009.

(51) Int. Cl.
*G06K 9/00* (2006.01)
*G06K 9/48* (2006.01)
*G01V 3/38* (2006.01)
*G01V 1/40* (2006.01)

(52) U.S. Cl.
USPC ............ 382/109; 382/141; 702/5; 702/11

(58) Field of Classification Search
None
See application file for complete search history.

(56) References Cited

U.S. PATENT DOCUMENTS

| | | | |
|---|---|---|---|
| 4,525,717 A * | 6/1985 | Wildermuth et al. ......... 342/452 |
| 4,745,550 A * | 5/1988 | Witkin et al. .................. 702/11 |
| 4,821,210 A * | 4/1989 | Rumbaugh .................... 345/421 |
| 4,841,444 A * | 6/1989 | Chittineni ...................... 702/18 |
| 4,935,905 A | 6/1990 | Gassaway |
| 4,963,865 A * | 10/1990 | Ichikawa et al. ......... 340/995.14 |
| 5,148,494 A * | 9/1992 | Keskes .......................... 382/109 |
| 5,150,295 A * | 9/1992 | Mattingly ........................ 702/5 |
| 5,544,052 A * | 8/1996 | Fujita et al. ..................... 702/5 |
| 5,586,234 A * | 12/1996 | Sakuraba et al. ............. 345/582 |
| 5,587,942 A * | 12/1996 | Krebs ............................. 367/50 |
| 5,742,297 A * | 4/1998 | Logan .......................... 345/672 |
| 5,748,197 A * | 5/1998 | Guibas et al. ................ 345/672 |
| 5,844,564 A * | 12/1998 | Bennis et al. ................. 345/423 |
| 5,903,515 A * | 5/1999 | Beasley et al. ................ 367/59 |
| 5,963,879 A | 10/1999 | Woodward et al. |
| 6,023,654 A * | 2/2000 | Mohlenkamp ................ 701/532 |
| 6,101,280 A * | 8/2000 | Reynolds ...................... 382/241 |
| 6,106,561 A * | 8/2000 | Farmer .......................... 703/10 |
| 6,498,607 B1 * | 12/2002 | Pfister et al. .................. 345/423 |
| 6,636,810 B1 * | 10/2003 | Moore et al. .................. 702/17 |
| 6,732,120 B1 * | 5/2004 | Du ................................. 715/764 |
| 6,853,922 B2 * | 2/2005 | Stark ............................. 702/14 |
| 6,868,334 B2 * | 3/2005 | Nakane et al. ................ 701/451 |
| 7,024,021 B2 * | 4/2006 | Dunn et al. .................... 382/109 |
| 7,353,051 B2 * | 4/2008 | Wulff ......................... 455/575.4 |
| 7,487,040 B2 * | 2/2009 | Catalinotto ................... 701/409 |
| 7,676,534 B2 * | 3/2010 | Murakami et al. ............ 708/442 |
| 7,872,647 B2 * | 1/2011 | Mayer et al. .................. 345/420 |
| 7,899,272 B1 * | 3/2011 | Hsu .............................. 382/294 |

(Continued)

FOREIGN PATENT DOCUMENTS

JP    60158369 A  *  8/1985  ............. G01S 13/91

*Primary Examiner* — Wenpeng Chen
(74) *Attorney, Agent, or Firm* — Lam Nguyen; Rodney Warfford (57) ABSTRACT

Implementations of dynamic shape approximation are described. In one technique described herein, a feature of interest in a first coordinate reference system is accessed and at least a portion of the feature is identified and converted to a second coordinate reference system. In one implementation, the size of the portion is chosen such that the portion can be represented in the second coordinate reference system with an acceptable amount of error.

17 Claims, 10 Drawing Sheets

(56) References Cited

U.S. PATENT DOCUMENTS

| | | | |
|---|---|---|---|
| 8,280,107 B2* | 10/2012 | Kmiecik et al. | 382/103 |
| 8,351,704 B2* | 1/2013 | Kmiecik et al. | 382/190 |
| 2001/0029426 A1* | 10/2001 | Hancock et al. | 701/200 |
| 2002/0105857 A1* | 8/2002 | Ren et al. | 367/21 |
| 2002/0172401 A1* | 11/2002 | Lees et al. | 382/109 |
| 2003/0052875 A1* | 3/2003 | Salomie | 345/419 |
| 2003/0132934 A1* | 7/2003 | Fremming | 345/419 |
| 2005/0060097 A1* | 3/2005 | Pramik et al. | 702/14 |
| 2005/0104884 A1* | 5/2005 | Iwata et al. | 345/440 |
| 2005/0107948 A1* | 5/2005 | Catalinotto | 701/208 |
| 2005/0162425 A1* | 7/2005 | Kyle et al. | 345/442 |
| 2005/0288863 A1* | 12/2005 | Workman | 702/14 |
| 2006/0041375 A1* | 2/2006 | Witmer et al. | 701/208 |
| 2006/0209064 A1* | 9/2006 | Otani | 345/419 |
| 2008/0249704 A1* | 10/2008 | Cummings | 701/208 |
| 2010/0105399 A1* | 4/2010 | Akerlund | 455/446 |
| 2010/0166256 A1* | 7/2010 | Kmiecik et al. | 382/103 |
| 2010/0208937 A1* | 8/2010 | Kmiecik et al. | 382/100 |
| 2010/0220895 A1* | 9/2010 | Koren et al. | 382/109 |
| 2010/0289802 A1* | 11/2010 | Falchetto | 345/442 |
| 2010/0299370 A1* | 11/2010 | Otto | 707/803 |

* cited by examiner

DYNAMIC SHAPE APPROXIMATION

BACKGROUND

Three dimensional seismic data from a hydrocarbon reservoir is often binned into a latticed binning grid. A binning grid can be a three dimensional representation of an earth volume and include a flat approximation of the earth's surface formed by a series of orthogonal crossing lines projected on the earth's surface.

Often, different portions of the earth are associated with their own distinct binning grids in unique projected coordinate reference systems. Use of such unique projected coordinate reference systems can often be problematic when integration of data associated with binning grids from various portions of the earth is desired.

SUMMARY

Implementations of dynamic shape approximation are described. In one possible embodiment, a feature of interest in a first coordinate reference system is accessed and at least a portion of the feature is identified and converted to a second coordinate reference system. In one implementation, the size of the portion is chosen such that the portion can be represented in the second coordinate reference system with an acceptable amount of error.

This summary is provided to introduce a selection of concepts that are further described below in the detailed description. This summary is not intended to identify key or essential features of the claimed subject matter, nor is it intended to be used as an aid in determining the scope of the claimed subject matter.

BRIEF DESCRIPTION OF THE CONTENTS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

This disclosure is directed to techniques for implementing dynamic shape approximation. More particularly, the techniques described herein involve converting features or sections of interest from one coordinate reference system into another coordinate reference system on the fly, rather than statically converting an entire binning grid (of which the feature or section may be a part) into a new coordinate reference system.

For example, a dynamic conversion of portions of a binning grid can be done such that errors in conversion can be controlled. If no errors are tolerated, a precise shape conversion of a desired feature in the binning grid can be performed. Otherwise, a level of tolerable error can be chosen and the conversion can be performed on that basis. Acceptable error levels can be chosen with computational performance in mind (including speed of conversion, use of computational overhead, etc).

In this manner a binning grid to be reprojected can be stored in its original coordinate reference system and portions of interest in the binning grid can be dynamically converted when and where desired. Correspondingly, integration of geospatial data with different original projected coordinate reference systems can be accomplished without introducing additional errors into the geospatial data:

In one possible implementation, conversion error can be controlled by approximating a curved line resulting from a conversion between coordinate reference systems as a straight line segment. The length of the straight line can be chosen such that any error introduced by the approximation is below a given value. For instance, the length of the straight line can be chosen such that the error introduced is below a screen pixel, which may not detectable by the human eye.

In another possible implementation, several straight line approximations can be used to represent a curved line while maintaining a desired level of accuracy.

It will be understood that dynamic shape approximation, as described herein and recited in the claims, can be used whenever conversions are made between coordinate reference systems (CRSs). This includes conversions between several projected coordinate reference systems (CRS) as well as conversions between projected coordinate reference systems and geocentric coordinate reference systems (such as, for example, an Earth-Centered, Earth-Fixed (ECEF) CRS). Therefore, the term "coordinate reference system" as used herein will be understood to mean any coordinate reference system known in the art, including projected coordinate reference systems and geocentric coordinate reference systems.

Moreover, it will be noted that terms such as "conversion" and "reprojection" will be used interchangeably to describe conversion from one coordinate reference system to another. As such, neither of these terms will require that either the original or new coordinate reference system be a projected coordinate reference system.

Furthermore, it will be noted that techniques for implementing dynamic shape approximation can also be used in conjunction with conversions in which one datum is transformed to another datum.

Example Environment

Figure 1:
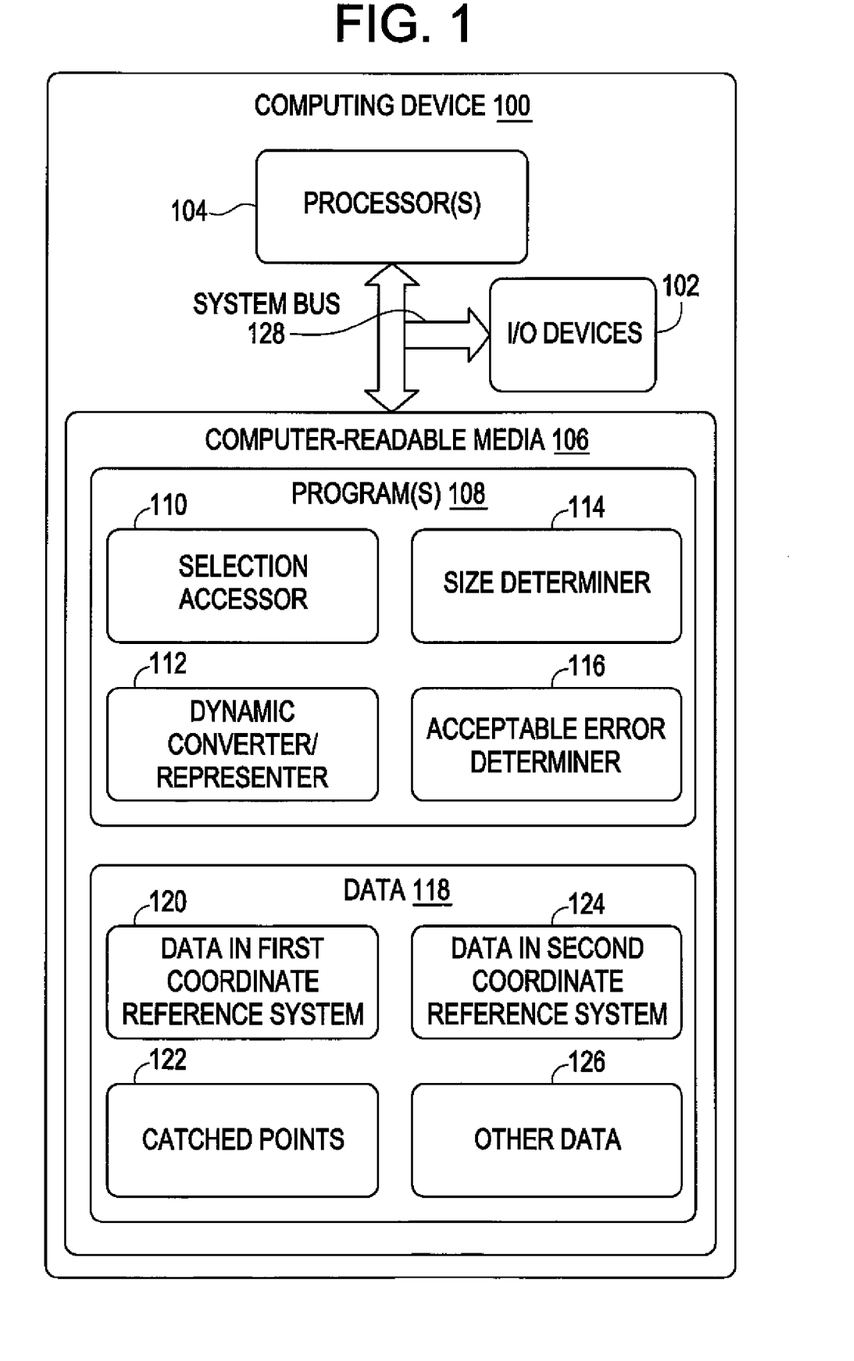
FIG. 1 illustrates an example computing device on which elements of dynamic shape approximation can be implemented.

FIG. 1 shows an example computing device 100 suitable for implementing embodiments of dynamic shape approximation. Computing device 100 can be implemented as any form of computing and/or electronic device. For example, computing device 100 can include a server, a desktop PC, a notebook or portable computer, a workstation, a mainframe computer, an Internet appliance and so on. Computing device 100 includes input/output (I/O) devices 102, one or more processor(s) 104, and computer-readable media 106.

I/O devices 102 can include any device over which data and/or instructions can be transmitted or received by computing device 100. For example, I/O devices 102 can include one or more of an optical disk drive, a USB device, a keyboard, a touch screen, a monitor, a mouse, a digitizer, a scanner, a track ball, etc.

I/O devices 102 can also include one or more communication interface(s) implemented as any of one or more of a serial and/or parallel interface, a wireless interface, any type of network interface, a modem, a network interface card, or any other type of communication interface capable of connecting computing device 100 to a network or to another computing or electrical device.

Processor(s) 104 include microprocessors, controllers, and the like configured to process various computer executable instructions controlling the operation of computing device 100. For example, processor(s) 104 can enable computing device 100 to communicate with other electronic and computing devices, and to process instructions and data in conjunction with programs 108 stored in computer-readable media 106.

Computer-readable media 106, can include one or more memory components including random access memory (RAM), non-volatile memory (e.g., any of one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer-readable media 106 provides storage mechanisms to store various information and/or data such as software applications and any other types of information and data related to operational aspects of computing device 100. For example, programs 108 stored on computer-readable media 106 can include a selection accessor 110, a dynamic converter/representer 112, a size determinor 114, an acceptable error determinor 116, and other programs—such as an operating system and/or assorted application programs. Programs 108 can be executed on processor(s) 104.

Computer-readable media 106 can also include data 118. For example, as illustrated in FIG. 1, data 118 residing on computer-readable media 106 can include data in first coordinate reference system 120, cached points 122, data in second coordinate reference system or geocentric coordinate reference system 124, and other data 126 (including intermediate and final data created through use of one or more of programs 108).

Any of programs 108 and data 118 can reside wholly or partially on any of a variety of media types found in computer-readable media 106. For example, portions of size determinor 114 can reside at different times in random access memory (RAM), read only memory (ROM), optical storage discs (such as CDs and DVDs), floppy disks, optical devices, flash devices, etc.

A system bus 128 can couple one or more of the processor(s) 104, I/O devices 102 and computer-readable media 106 to each other. System bus 128 can include one or more of any of several types of bus structures, including a memory bus or memory controller, a peripheral bus, an accelerated graphics port, and a processor or local bus using any of a variety of bus architectures. By way of example, such architectures can include an industry standard architecture (ISA) bus, a micro channel architecture (MCA) bus, an enhanced ISA (EISA) bus, a video electronics standards association (VESA) local bus, and a peripheral component interconnects (PCI) bus also known as a mezzanine bus, and so on.

Example Binning Grid and Reprojected Binning Grid

Figure 2:
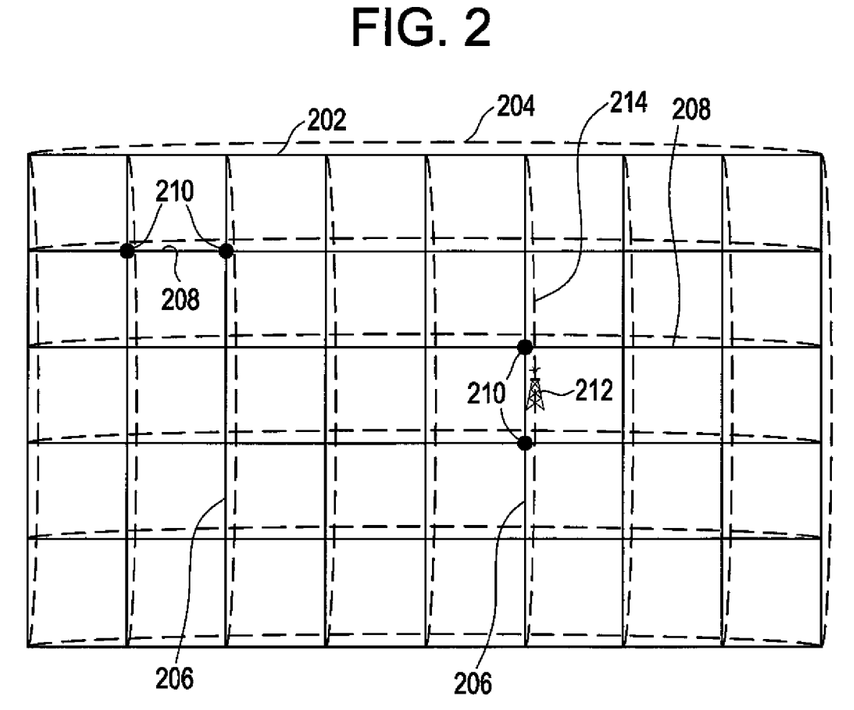
FIG. 2 illustrates an example binning grid from a first coordinate reference system converted into a second coordinate reference system.

FIG. 2 illustrates an example three dimensional (3D) seismic binning grid 202 from a first projected coordinate reference system reprojected into 3D seismic binning grid 204 in a second projected coordinate reference system. 3D seismic binning grid 202 can be created using any gridding system known in the art. In one possible implementation, 3D seismic binning grid 202 is a mathematical representation of a matrix formed by regularly spaced processed seismic traces, such as a vertical gridlines 206, also called bin nodes. In one implementation, locations of bin nodes can be referenced to earth locations by use of a projected coordinate reference system. In one possible embodiment, a projected coordinate reference system can include a combination of an ellipsoid (like Clarke 1866 or GRS 80) with a geodetic datum (like WGS 84, NAD27, NAD83, ED50) and a map projection system (like Universal Transverse Mercator (UTM), Lambert Conformal Conic (LCC), Albers Projection).

The geometry of 3D seismic binning grid 202 can include an orthogonal and rectangular lattice when represented in the original projected coordinate reference system of binning grid 202. For example, vertical gridlines, such as vertical gridlines 206, can orthogonally intersect horizontal gridlines 208 at intersection points 210.

It is also possible however that lines 206 aren't parallel with one another. Similarly lines 208 need not be parallel to one another. Moreover, lines 206 and 208 need not be orthogonal to each other. Therefore, in other possible implementations, the binset need not be orthogonal.

However, when 3D seismic binning grid 202 is converted to another projected coordinate reference system—or is converted between a projected coordinate reference system and another type of coordinate reference system (such as, for example Earth Centered, earth Fixed (ECEF) coordinates)—the shape of the resulting reprojected 3D seismic binning grid 204 is no longer rectangular. Instead, the shape of reprojected seismic binning grid 204 is often more complex than original 3D seismic binning grid 202, with all sides of reprojected 3D seismic binning grid 204 being bent. As a result, simple data representations used in original 3D seismic binning grid 202 cannot always faithfully be used in conjunction with reprojected 3D seismic binning grid 204.

Stated another way for the sake of explanation, features from 3D seismic binning grid 202, such as linses, may no longer be straight when converted into a second coordinate reference system. Consequently, grids like those formed by lines 206 and 208 may change shape, and may even become more complex (for example rectangles may lose their rectangularity).

In general, 3D geometric shape properties cannot be represented without errors in a map projection. Therefore errors are inherent when 3D seismic binning grids are converted to other coordinate reference systems. Interestingly, however, distinct points in a seismic volume, such as intersection points 210, can be re-projected from one coordinate reference system to another without new errors being introduced.

In the example implementation shown in FIG. 2, a feature 212 (such as a well) which straddles seismic data represented by vertical gridline 206 in 3D seismic binning grid 202, has been reprojected to curved vertical gridline 214 in reprojected 3D binning grid 204. Thus, even though the point data, and therefore the location, of feature 212 has been converted correctly, the shape of 3D seismic binning grid 204 has been distorted enough such that feature 212 is no longer aligned with its corresponding seismic data (represented by vertical gridline 206).

Therefore, by representing 3D seismic binning grid 204 with an implicit geometry which has not been correctly converted to the new coordinate reference system, error has been introduced in the integration of seismic and lower dimensional data (such as, for example, well data associated with feature 212). In some instances, this error can be of such magnitude as to considerably degrade or altogether vitiate the usefulness of 3D seismic binning grid 204 to petropyhsicists.

Example Seismic Section

Figure 3A:
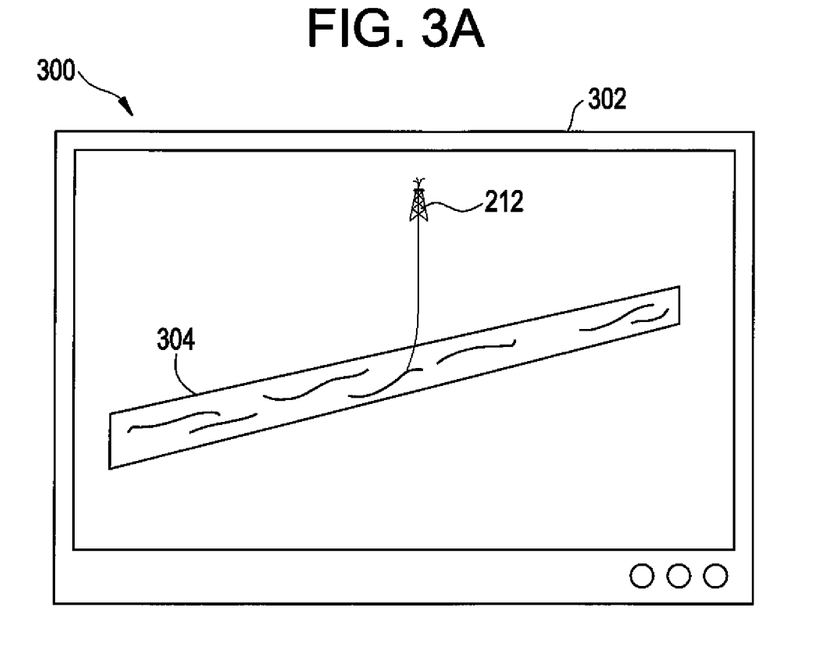
FIG. 3 illustrates an example seismic section and well trajectory displayed on a monitor.
Figure 3B:
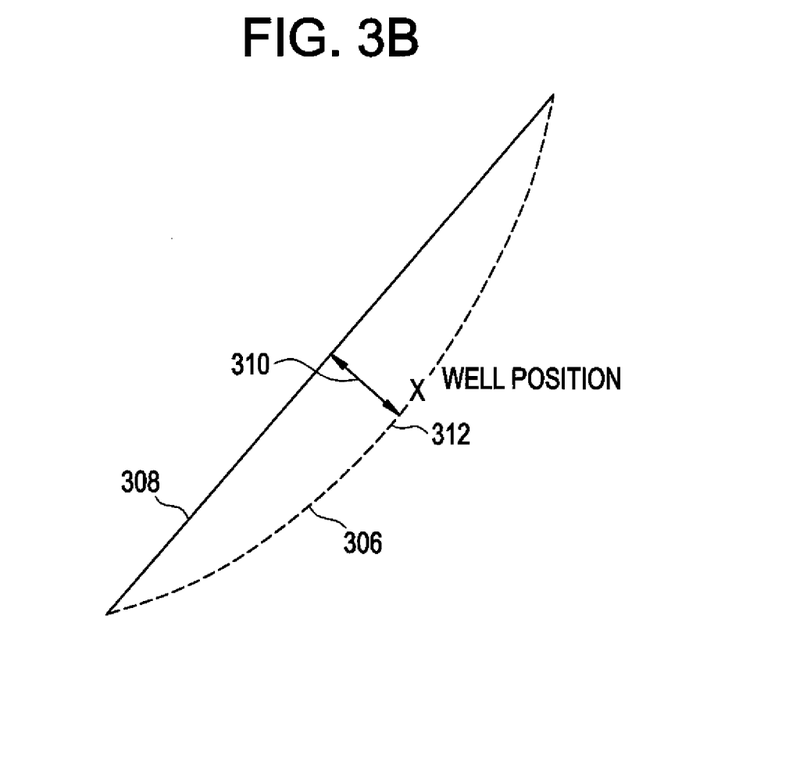

FIG. 3 illustrates an example seismic section and well trajectory 300 displayed on a monitor 302. Workflow interpretations are often performed on a computer workstation based on visual interactions with a monitor 302 having a given resolution at which the human eye will perceive a nearly straight line as being straight. Using this concept, desired performance and accuracy for an interactive workflow can be achieved by drawing a curved line as a straight line when the curvature of the curved line is small enough such that is not possible to be seen or drawn on monitor 302.

For example, in one possible implementation, a portion of seismic section and well trajectory 300, namely a 250 km long straight seismic line 304, is represented in for instance, UTM zone 31. Line 304 is placed inside UTM zone 31 at about 60°53'N and 3°53'E (ED50). If line 304 is converted to UTM 30, it will become a 250 km bent line 306.

It will be understood that the terms 'portion', 'section' and 'feature' as used herein can include anything of interest in a reservoir model, including a full seismic section or a portion thereof.

Returning to our example, if curved seismic line 306 with a length of 250 km is drawn as a straight line 308, the conversion error 310 introduced at midpoint 312 of line 306 is about 64 meters. The term 'conversion error' or 'error', as used herein, can be interpreted to mean any error encountered and/or created by converting something from a first coordinate reference system to a second coordinate reference system.

If monitor 302 has a display resolution of 1900 by 1200 pixels and shows 300 km horizontally, the resolution is about 150 meters per pixel. Since error 310 is less than 150 meters (and therefore less than one pixel), error 310 will not be detectable by the human eye, and line 306 may be drawn as straight line 308 without introducing any visible error.

Figure 4A:
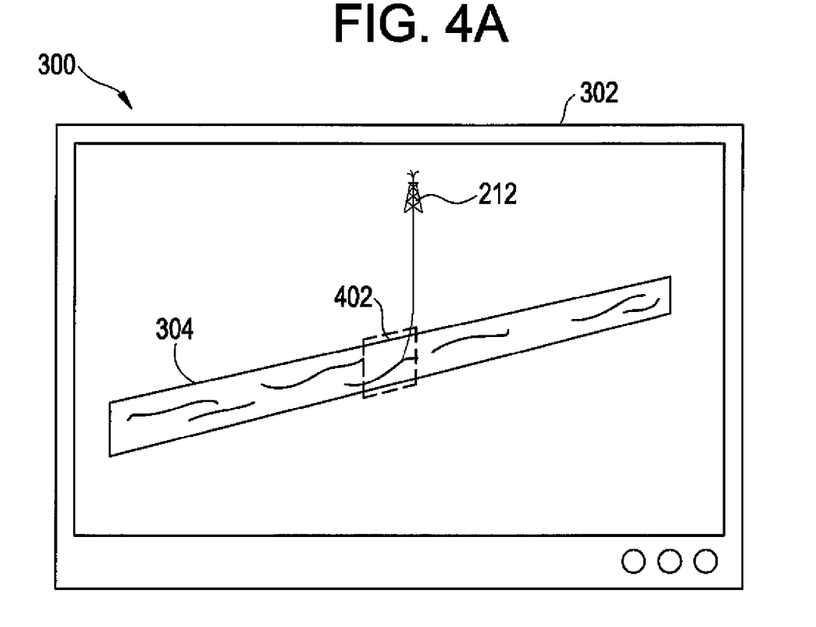
FIG. 4 illustrates an example portion of a seismic section and well trajectory.
Figure 4B:
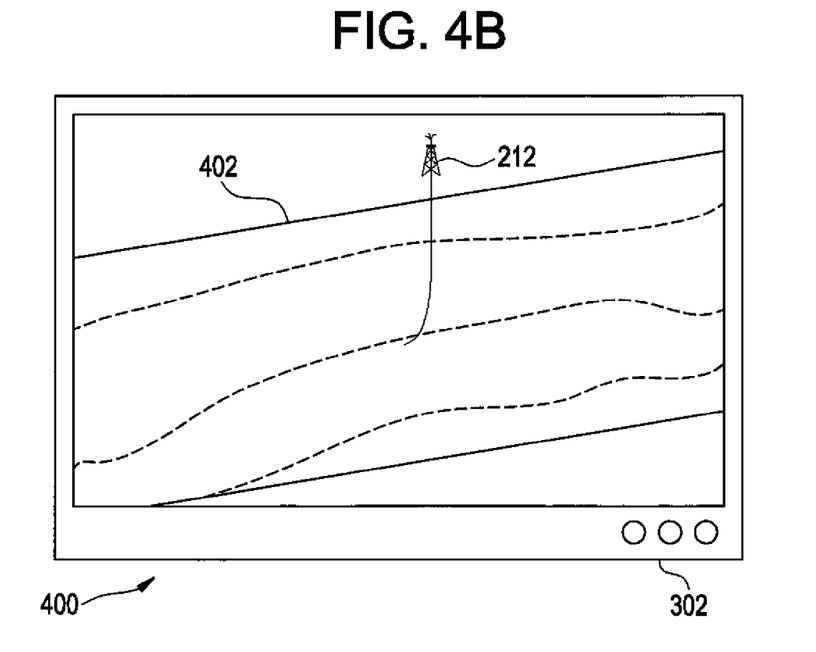

FIG. 4 illustrates this concept further with an example zoomed in section 400 of example seismic section and well trajectory 300 displayed on monitor 302. As shown, when zooming from line 304 into a 10 km long middle portion 402 of line 304, error 310 of 64 meters can become significant unless the position of portion 402 is adjusted.

Figure 5A:
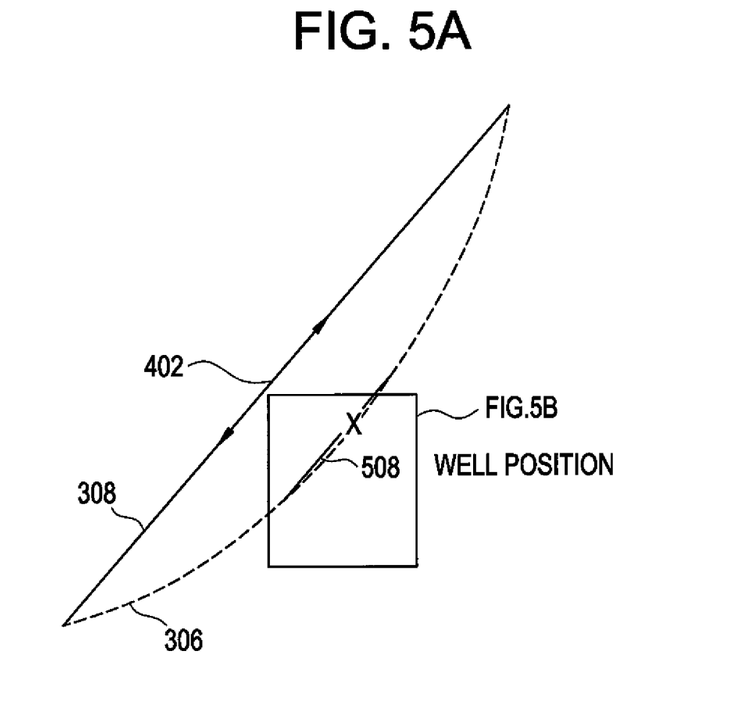
FIG. 5 illustrates an example embodiment of dynamic shape linearization.
Figure 5B:
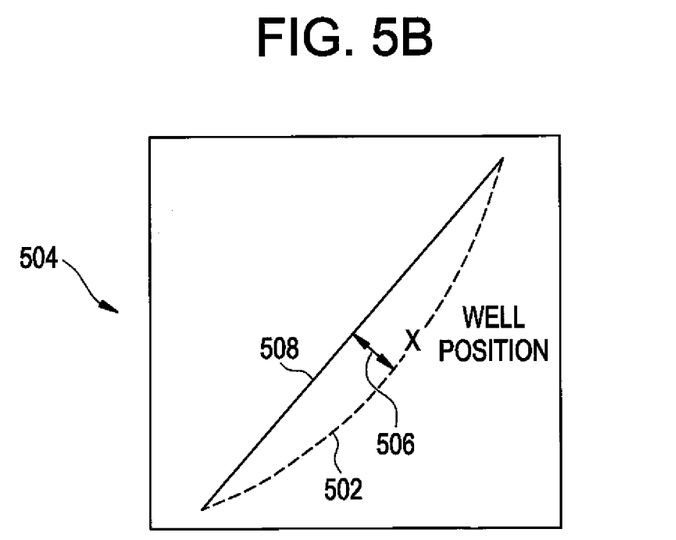

FIG. 5 illustrates this adjustment by showing portion 402 converted to a new coordinate reference system (such as from UTM 31 to UTM 30 in the instant example) in which portion 402 will become bent line 502.

When portion 402 is featured in a zoomed in view 504, a conversion error 506 encountered in drawing portion 402 as a straight line 508 instead of as curved line 502 is reduced from 64 meters to 0.5 meters. If monitor 302 has a resolution of 1900 by 1200 pixels and shows 10 km horizontally, the resolution of monitor 302 is approximately 5 meters per pixel. Therefore, since error 506 of 0.5 meters is below the per pixel threshold of 5 meters per pixel for monitor 302, it will not be possible to see the curvature of portion 502 on monitor 302. As such, by representing curved portion 502 as a straight line 508, no new visible error will be introduced.

Example Shape Reprojected Using Dynamic Linearization

Figure 6:
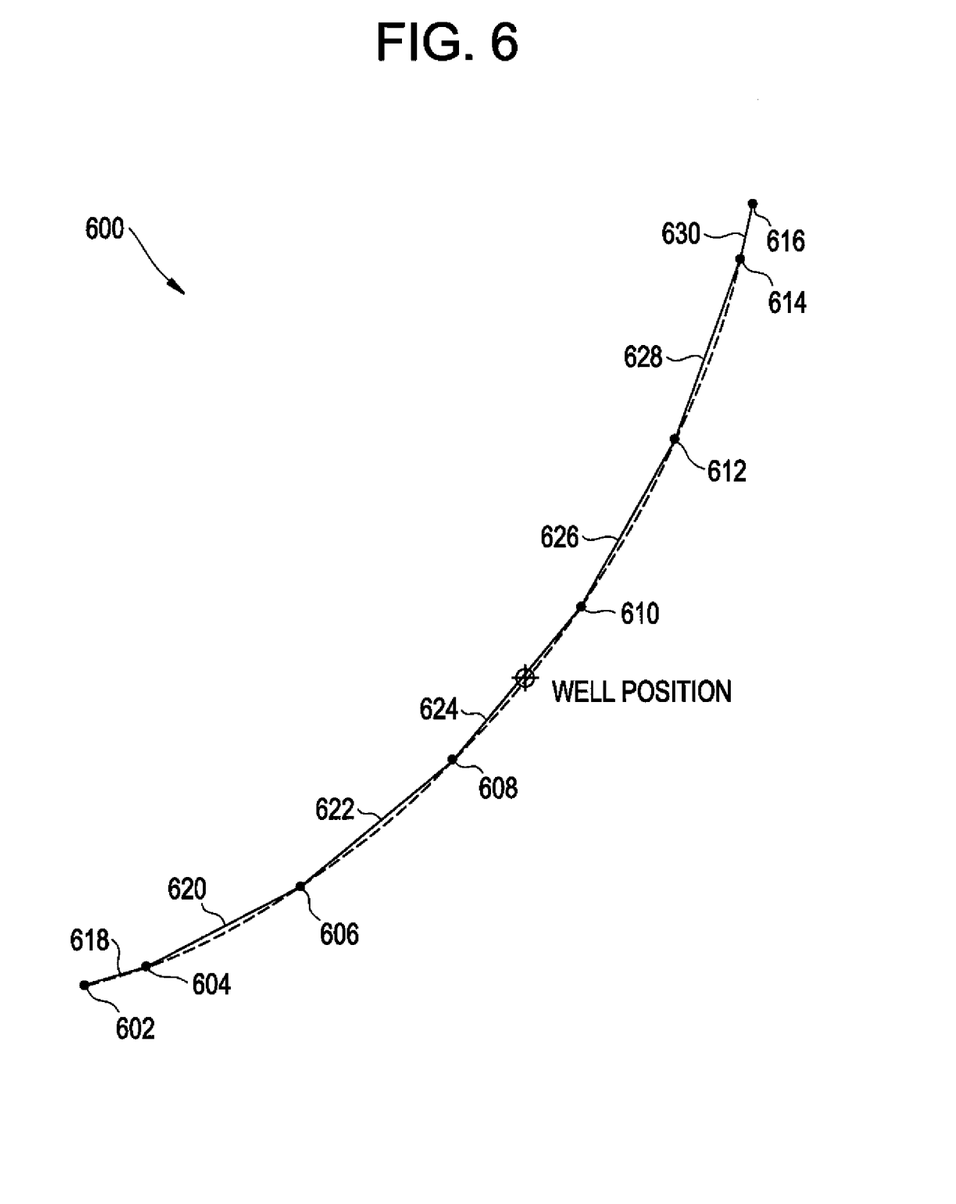
FIG. 6 illustrates an example reprojected shape drawn using dynamic linearization.

FIG. 6 illustrates an example reprojected shape 600 drawn using dynamic linearization in which multiple straight lines are drawn to approximate an original curved shape. For example, control points 602-616 can be added along a length of reprojected line 306, splitting line 306 into several shorter segments 618-630. Each shorter segment can be constructed such that an error (such as errors 310 and 506 discussed above) associated with reprojecting the curved segments of line 306 into their corresponding straight segments 618-630 is under an acceptable threshold. In one implementation, having an error below that which can be depicted by a single pixel on monitor 302 can be seen as being acceptable. Similarly, under another implementation, having an error below a preset error deemed by a user or a quality control algorithm to produce reliable and/or useable data can be seen as acceptable.

Reprojected shape 600 is shown in FIG. 6 to be an approximation of a reprojected curved line, however it will be understood that the techniques described above could be used with any shape or feature converted into another coordinate reference system.

Furthermore it will be understood that the length of segments 618-630 can be chosen in any manner of ways. For example, a length of segments 618-630 can be chosen to be equal for all segments 618-630. Alternately, differing lengths can be used among segments 618-630, with the length of each segment 618-630 being chosen such that resulting errors between the segments 618-630 and their corresponding curved segments on line 306 result in errors to spatial data which are acceptable under one of the criteria discussed above.

Example Binning Grid Reprojected Using Dynamic Linearization

Figure 7:
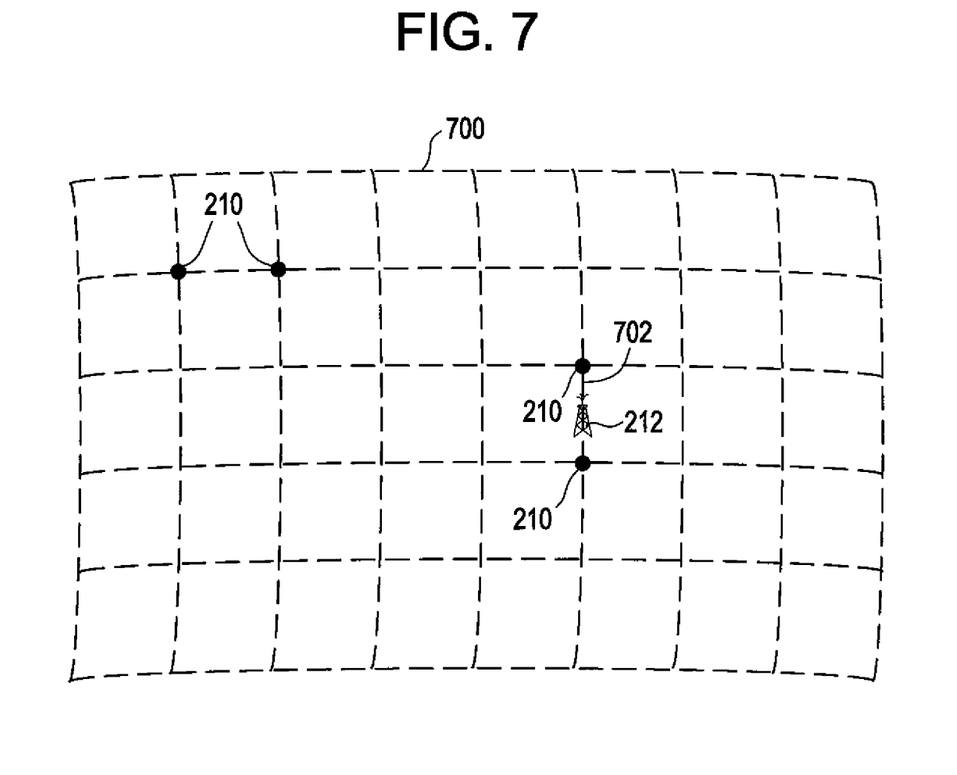
FIG. 7 illustrates an example reprojected bin grid drawn using dynamic linearization.

FIG. 7 illustrates an example reprojected binning grid 700 drawn using dynamic linearization in which multiple straight lines are drawn to approximate a curved shape. Binning grid 700 is an approximation of a reprojected binning grid, such as reprojected binning grid 204. However, in contrast to reprojected binning grid 204, approximated reprojected binning grid 700 has been created using dynamic linearization such that feature 212 is correctly aligned with its corresponding seismic data (represented by vertical gridline 702).

In one possible implementation, intersection points 210 defined by a crossing of a vertical gridline 206 and a horizontal gridline 208 in binning grid 202 can be accurately reprojected in a new desired coordinate reference system. Gridlines between these reprojected points can then be approximated by straight lines using the concepts of dynamic linearization discussed above.

In such a fashion a complex shape of a reprojected binning grid 204 can be represented by reprojected binning grid 700 with sufficient accuracy for petrophysicists to use reprojected binning grid 700 for seismic interpretation workflows. This can occur because lower dimensional data, including data such as interpretations of well data and cultural data, can be integrated with implicit geometries of 3D seismic surveys through use of dynamic linearization.

For example, in one possible implementation, intersection points 210 on vertical gridline 206 in binning grid 202 above and below feature 212 can be reprojected into a new coordinate reference system, and a straight vertical gridline 702 can be drawn connecting these points. Similarly other intersection points 210 in binning grid 202 can be reprojected into the new coordinate reference system and used to construct binning grid 700.

As many or as few intersection points can be reprojected as desired. For example, in one possible implementation, all intersection points 210 in binning grid 202 can be reprojected into the new coordinate reference system of binning grid 700. If desired, some or all of these intersection points 210 can be cached, such as in cached points 122. In such a fashion these cached points can be used later without having to be recalculated on the fly.

Alternately, only intersection points 210 associated with a feature of interest within binning grid 202—such as feature 212—or a section of interest of binning grid 202 can be reprojected into the new coordinate reference system of binning grid 700. In one possible implementation, the number of intersection points 210 converted into the new coordinate reference system is dependent on the level of accuracy desired. In such a manner all or a portion of binning grid 700 can be displayed with a controlled error according to a user's desire or interest.

EXAMPLE METHODS

Figure 8:
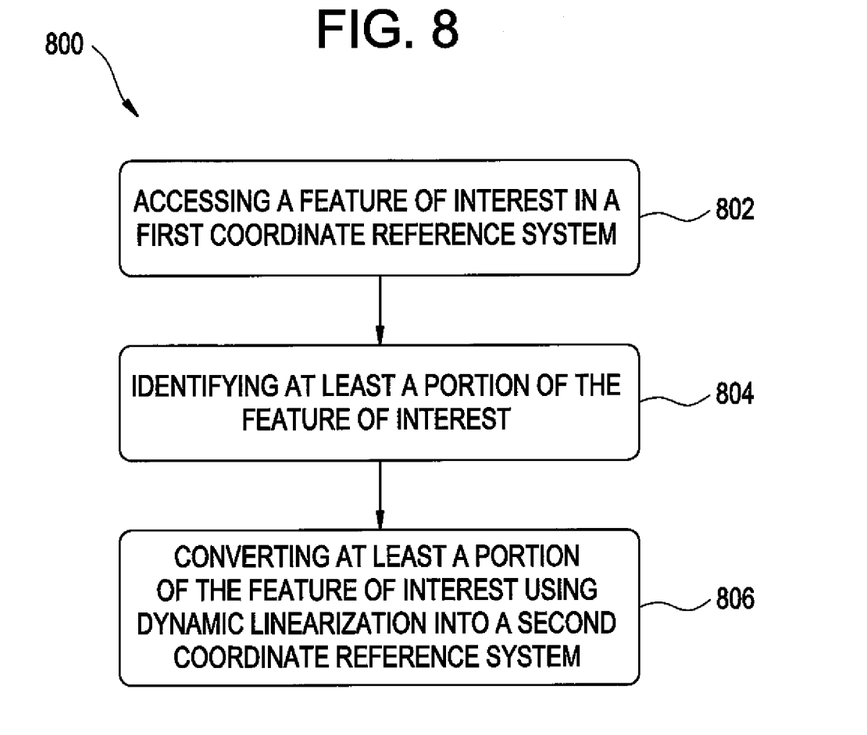
FIG. 8 illustrates example method(s) of dynamic shape approximation.
Figure 9:
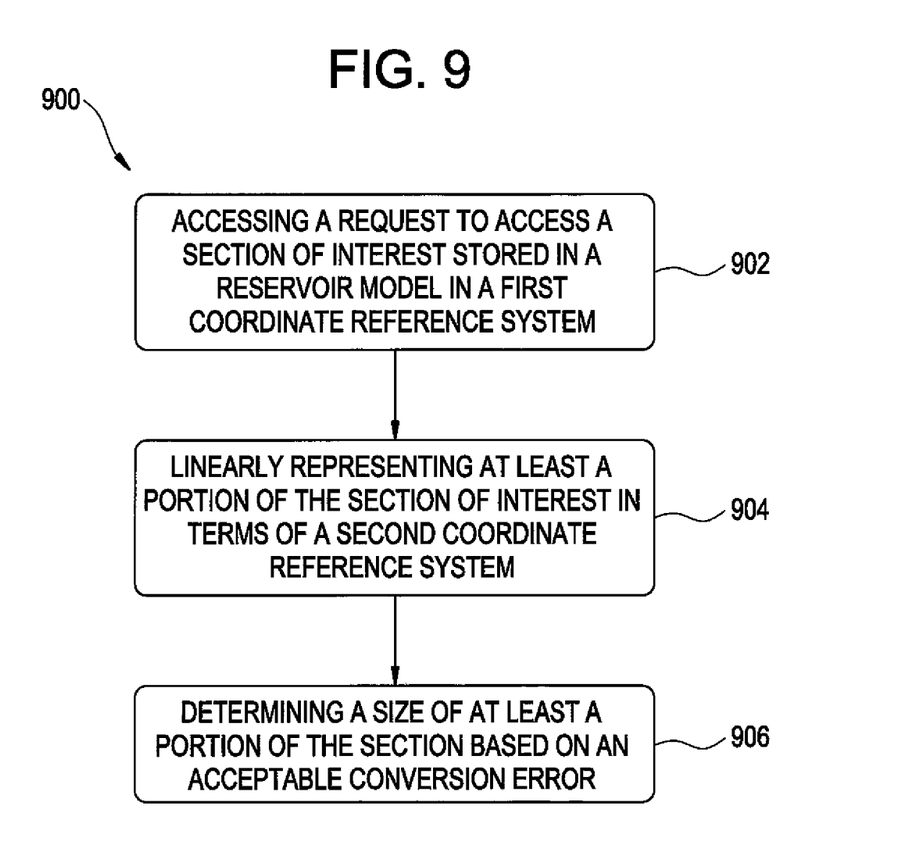
FIG. 9 illustrates example method(s) of dynamic shape approximation.
Figure 10:
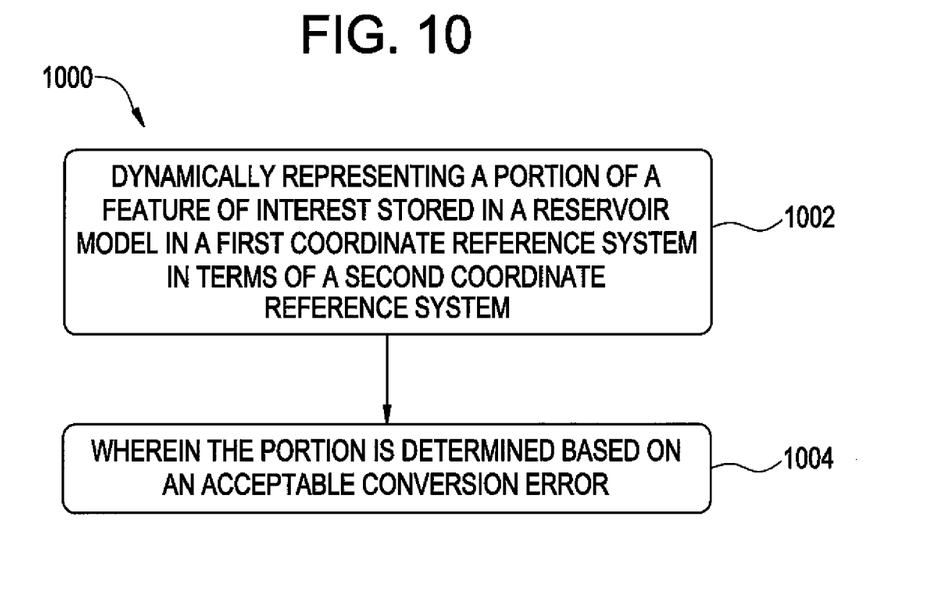
FIG. 10 illustrates example method(s) of dynamic shape approximation.

FIGS. 8-10 illustrate example methods for implementing aspects of dynamic shape approximation. The methods are illustrated as a collection of blocks in a logical flow graph representing a sequence of operations that can be implemented in hardware, software, firmware, various logic or any combination thereof. The order in which the methods are described is not intended to be construed as a limitation, and any number of the described method blocks can be combined in any order to implement the methods, or alternate methods. Additionally, individual blocks may be deleted from the methods without departing from the spirit and scope of the subject matter described therein. In the context of software, the blocks can represent computer instructions that, when executed by one or more processors, perform the recited operations. Moreover, for discussion purposes, and not purposes of limitation, selected aspects of the methods may described with reference to elements shown in FIGS. 1-7.

Example Method I

FIG. 8 illustrates an example method 800 for implementing dynamic shape approximation. At block 802, a feature of interest in a first coordinate reference system is accessed. For example, in one implementation the feature of interest can include data represented on a binning grid, such as binning grid 202. For instance, the feature of interest can include data associated with elements such as: feature 212, a seismic line (including seismic line 304), portions of seismic lines (such as portion 402), all or part of the binning grid, or any other data of interest.

The feature of interest can be accessed by interacting with data associated with the feature of interest. For example, in one possible implementation, data in first coordinate reference system 120 can be searched for particular data associated with the feature of interest.

At block 804, at least a portion of the feature of interest is identified. In one implementation, the portion can include a subset of the feature as accessed in block 802, and can be identified at least partially based on user input. Alternately, the portion can include the entire feature.

For example, a user interacting with a binning grid, such as binning grid 202, can select or otherwise indicate a desire to interact with a feature of the binning grid, or a portion thereof. In one implementation, the user may highlight the feature or portion, or choose to zoom in on a section of the binning grid being displayed on a monitor, such as monitor 302.

At block 806, the portion of the feature of interest can be converted into the second coordinate reference system using dynamic linearization. For example, the portion of the feature of interest can be converted from its original coordinate reference system, such as UTM zone 31, into a new coordinate reference system, such as UTM 30.

In one possible implementation, straight lines in the portion will become curved as they are converted into the second coordinate reference system. Curved lines in the feature created in this manner can be approximated by one or more straight lines, with the length of the one or more straight lines being determined based on an acceptable conversion error associated with approximating the curved lines as straight lines.

For example, in one possible implementation, a curved line, such as line 306 or portion 502, can be approximated by a straight line approximation (such as lines 308 and 508 respectively) if an error in the approximation (such as errors 310 and 506 respectively) are acceptable. In one embodiment an error is acceptable if it doesn't vitiate the usability of the approximated data. For instance, in one aspect, if the error is less than that which can be represented on the monitor, then the curved line can be represented by the straight line without any visible data loss.

In another possible implementation, the curved line can be represented by multiple straight section approximations, such as segments 618-630.

Example Method II

FIG. 9 illustrates another example method 900 for implementing dynamic shape approximation. At block 902 a request to access a section of interest stored in a reservoir model in a first coordinate reference system is accessed. For example, in one possible implementation, the request is input by a user to view all or portion of a binning grid, such as binning grid 202, being displayed on a monitor, such as monitor 302. This request can be received by a portion of a computing device, such as computing device 100, being utilized by the user. In one possible embodiment, a program, such as selection accessor 110, can receive the user request.

At block 904, at least a portion of the section of interest is linearly represented in terms of a second coordinate reference system. In one possible implementation, straight lines in the portion will become curved as they are converted into the second coordinate reference system. Curved lines in the portion created in this manner can be approximated by one or more straight lines.

For example, in one possible implementation, a curved line, such as line 306 or portion 502, can be approximated by a straight line approximation (such as lines 308 and 508 respectively). In one aspect, the curved line and its straight line approximation share endpoints, such as endpoints, 210, which can be accurately converted from the first coordinate reference system to the second coordinate reference system.

In another possible implementation, curved areas of the portion can be represented using a plurality of straight sections, such as sections 618-630. The sections can share endpoints, such as endpoints 602-616 with the curved sections of the portion they are approximating.

In one possible aspect, the portion being approximated is the entire binning grid.

At block 906, a size of the at least a portion of the section is determined based on an acceptable conversion error. In one implementation, the conversion error can equal an error between a straight line approximation and its respective curved portion (such as errors 310 and 506). In one aspect, the error can be seen as acceptable if it doesn't vitiate the usability of the approximated data. For instance, in one aspect, if the error is less than that which can be represented on the monitor, then the curved line can be represented by the straight line without any visible data loss.

Example Method III

FIG. 10 illustrates another example method 1000 for implementing dynamic shape approximation.

At block 1002, a portion of a feature of interest stored in a reservoir model in a first coordinate reference system is dynamically represented in terms of a second coordinate reference system. For example, in one possible implementation, a resulting curved line reprojected into a second coordinate reference system, such as line 306 or portion 502, can be approximated by a straight line approximation (such as lines 308 and 508 respectively). In one possible aspect, the portion being approximated is the entire binning grid.

In one possible embodiment, the curved line and its straight line approximation share endpoints, such as endpoints, 210, which can be accurately converted from the first coordinate reference system to the second coordinate reference system.

In another possible implementation, curved areas of the portion can be represented using a plurality of straight sections, such as sections 618-630. The sections can share endpoints, such as endpoints 602-616 with the curved sections of the portion they are approximating.

At block 1004, the portion is determined based on an acceptable conversion error. In one implementation, the conversion error can equal an error between a straight line approximation and its respective curved portion (such as errors 310 and 506), and can be acceptable if it doesn't vitiate the usability of the approximated data. For instance, in one aspect, if the error is less than that which can be represented on the monitor, then the curved line can be represented by the straight line without any visible data loss. Alternately, the curved line should be broken into one or more segments, such as sections 618-630, such that the errors between the segments and the curved portions they represent are acceptable.

CONCLUSION

Although embodiments of dynamic shape approximation have been described in language specific to structural features and/or methods, it is to be understood that the subject of the appended claims is not necessarily limited to the specific features or methods described. Rather, the specific features and methods are disclosed as exemplary implementations of dynamic shape approximation.

What is claimed is:

1. A method comprising:
   providing a feature that comprises coordinates defined with respect to a first geospatial coordinate reference system;
   displaying the feature on a monitor at an approximate location with respect to a second geospatial coordinate reference system; and
   responsive to zooming, re-approximating the location of the feature with respect to the second geospatial coordinate reference system via a linearized curve, the linearized curve being determined in part by conversion of at least one of the coordinates of the feature defined with respect to the first geospatial coordinate reference system to at least one coordinate defined with respect to the second geospatial coordinate reference system.

2. The method of claim 1, wherein the linearized curve comprises a number of linear segments such that error between the re-approximated location of the feature and an actual location of the feature in the second geospatial coordinate reference system will not be visible given a resolution of the monitor on which the feature is displayed.

3. The method of claim 1, wherein the method is performed dynamically responsive to the zooming.

4. The method of claim 1, wherein the feature comprises data and further comprising:
   caching at least a portion of the data as being located with respect to coordinates of the second coordinate reference system.

5. The method of claim 1 wherein the feature comprises a seismic line of a seismic volume.

6. The method of claim 5 wherein the seismic volume comprises a binning grid defined with respect to the first geospatial coordinate reference system.

7. The method of claim 6 wherein the binning grid is located proximate to a border between the first geospatial coordinate reference system and the second geospatial coordinate reference system.

8. A non-transitory computer-readable medium comprising a set of computer-readable instructions residing thereon that, when executed, direct a processor to initiate acts comprising:
   accessing a feature that comprises coordinates defined with respect to a first geospatial coordinate reference system;
   displaying the feature on a monitor at an approximate location with respect to a second geospatial coordinate reference system; and
   responsive to zooming, re-approximating the location of the feature with respect to the second geospatial coordinate reference system via a linearized curve, the linearized curve being determined in part by conversion of at least one of the coordinates of the feature defined with respect to the first geospatial coordinate reference system to at least one coordinate defined with respect to the second geospatial coordinate reference system.

9. The non-transitory computer-readable medium of claim 8 comprising a set of computer-readable instructions that, when executed, perform acts further comprising selecting linear lengths to be used to form a linearized portion of the feature, such that each length has an acceptable conversion error when represented with respect to the second coordinate reference system.

10. The non-transitory computer-readable medium of claim 9 comprising a set of computer-readable instructions that, when executed, perform acts further comprising caching endpoints of the linear lengths expressed in terms of the second coordinate reference system.

11. The computer-readable non-transitory medium of claim 8 wherein the feature is a feature of a reservoir model.

12. The non-transitory computer-readable medium of claim 8 wherein the feature comprises data of a seismic volume that comprises a binning grid defined with respect to the first geospatial coordinate reference system.

13. The non-transitory computer-readable medium of claim 8 wherein the binning grid is located proximate to a border between the first geospatial coordinate reference system and the second geospatial coordinate reference system.

14. A system comprising:
   a processor;
   memory accessible by the processor; and
   instructions stored in the memory, the instructions being executable by the processor to
      access a feature that comprises coordinates defined with respect to a first geospatial coordinate reference system,
      display the feature on a monitor at an approximate location with respect to a second geospatial coordinate reference system, and
      responsive to receipt of a zoom instruction, re-approximate the location of the feature with respect to the second geospatial coordinate reference system via a linearized curve, the linearized curve being determined in part by conversion of at least one of the coordinates of the feature defined with respect to the first geospatial coordinate reference system to at least one coordinate defined with respect to the second geospatial coordinate reference system.

15. The system of claim 14 wherein the feature comprises a seismic line of a seismic volume.

16. The system of claim 15 wherein the seismic volume comprises a binning grid defined with respect to the first geospatial coordinate reference system.

17. The system of claim 16 wherein the binning grid is located proximate to a border between the first geospatial coordinate reference system and the second geospatial coordinate reference system.

\* \* \* \* \*